United States Patent [19]

Yano

[11] Patent Number: 4,877,219

[45] Date of Patent: Oct. 31, 1989

[54] PIPE FITTING

[75] Inventor: Kazuo Yano, Tokyo, Japan

[73] Assignee: Thyme Tech Co., Ltd., Tokyo, Japan

[21] Appl. No.: 260,031

[22] Filed: Oct. 20, 1988

[30] Foreign Application Priority Data

Oct. 20, 1987 [JP] Japan ................... 62-159252

[51] Int. Cl.$^4$ .............................. F16L 37/28
[52] U.S. Cl. .................... 251/149.2; 251/361
[58] Field of Search .............. 251/149.2, 149.1, 359, 251/360, 361

[56] References Cited

U.S. PATENT DOCUMENTS 3,618,892 11/1971 Scivto, Jr. ............... 251/149.2
4,007,909 2/1977 Buoeth et al. ............ 251/149.2
4,627,598 12/1986 Fremy ...................... 251/149.2

FOREIGN PATENT DOCUMENTS 2728192 12/1977 Fed. Rep. of Germany ... 251/149.2

Primary Examiner—A. Michael Chambers
Attorney, Agent, or Firm—Oblon, Spivak, McClelland, Maier & Neustadt

[57] ABSTRACT

A pipe fitting capable of minimizing flow resistance, decreasing force required for connection and preventing leakage of fluid therethrough. An operating sleeve slidably mounted on a main member of a socket body is forcedly thrusted and a connecting member of a connecting plug is fitted in an internal passage of the main member while pushing away balls fitted in the main member, so that the connecting member forcedly pushes an on-off valve arranged in the main member to pivotally move it for opening it. Releasing of the operating sleeve from its thrusted position causes the balls to be fitted in an annular groove of the connecting plug, to thereby accomplish connection between the socket body and the connecting plug.

3 Claims, 3 Drawing Sheets

PIPE FITTING

BACKGROUND OF THE INVENTION

1. Field of the Invention

This invention relates to a pipe fitting for connecting together pipes for pressurized fluid, and more particularly to a pipe fitting for rapidly and readily connecting an inlet pipe extending from a gas appliance or the like with a supply line for pressurized fluid such as pressurized gas.

2. Description of the Prior Art

A pipe fitting of thus type which has been conventionally used for this purpose is generally constructed in a manner as shown in FIGS. 3 and 4, wherein FIG. 3 is a vertical sectional view showing the conventional pipe fitting prior to use upon connection to a supply line and FIG. 4 is a vertical sectional view showing the pipe fitting in use after the connection.

More particularly, the conventional pipe fitting generally includes a socket body 10 and a connecting plug 40 connected to the socket body 10. The socket body 10 and connecting plug 40 are adapted to be connected to, for example, an end of a supply line for supplying fluid such as pressurized gas and an end of an inlet pipe extending from a gas appliance or the like, respectively.

The socket body 10 includes a main member 11 formed into a hollow cylindrical shape so as to define an internal passage 12 therein and a fitting member 21 threadedly connected to the main member 11 and likewise formed into a hollow cylindrical shape so as to define a passage 22 therein. The main member 11 is provided therein with an annular valve seat 13 acting also as a packing. More particularly, the valve seat 13 is arranged on a stepped support portion 12a circumferentially formed on an inner wall of main member 11 defining the internal passage 12 on a connection side of the main member 11. The so-arrange valve seat 13 is securely held on the stepped support portion 13a by a connecting portion of the fitting member 21 threadedly fitted in the main member 11 from the connection side of the member 11. Between the main member 11 and the fitting member 21 is interposedly arranged a disc-like on-off valve 31, which is openably seated on the valve seat 13 to carry out selective communication between the passages 12 and 22.

The internal passage 12 of main member 11 is formed on an opening side thereof with a plurality of tapered holding holes 12b in a manner to be spaced from one another at predetermined angular intervals in a circumferential direction of the passage 12, in which balls 14 for engagement are movably fitted. The main member 11 is also provided on an outer periphery thereof with an operating sleeve 15 for connection and disconnection. The operating sleeve 15 is slidably fitted on the main member 11 so as to be slidable in an axial direction of the main member. Between the main member 11 and the sleeve 15 is interposed a coiled spring 16 of a cylindrical shape which serves to constantly urge the sleeve 15 to hold it at its engaged position. The sleeve 15 is formed on an inner periphery thereof with a cam surface 15a which acts to inwardly project a part of each of the balls 14 into the internal passage 12.

The on-off valve 31 includes a valve plate 32 of a disc-like shape press contacted with the valve seat 13, a head 33 provided on a side of the valve plate 32 facing the internal passage 22 of the fitting member 21 and a guide 34 arranged on a side of the valve plate 32 facing the internal passage 12 of the main member 11. The so-constructed on-off valve 31 is normally held at its closed position by an elastic force of a coiled spring 35 of a conical shape interposedly arranged between the head 33 and a stepped support portion 22a formed on a periphery of the internal passage 22 of the fitting member 21. The guide 34 of the on-off valve 31 is formed on an outer periphery thereof with a stepped portion 34a for engagement which is used for operating the on-off valve 31.

The connecting plug 40 is formed into a shape like a hollow cylinder having an outer configuration sufficient to permit the connecting plug 40 to be detachably fitted in the internal passage 12 of the main member 11. The connecting plug 40 includes a connecting member 41 formed therein with a passage 42 and having a cylindrical connecting portion 43 positioned on its connection side. The cylindrical connecting portion 43 is formed on an outer periphery thereof with an annular groove 44, which is adapted to be detachably engaged with the balls 14 when the plug 40 is connected to the socket body 10.

When the conventional pipe fitting constructed as described above is not in use wherein the connecting plug 40 is not connected to the socket body 10, the on-off valve 31 is forcedly pressed against the valve seal 13 due to elastic force of the coiled spring 35, to thereby be held at its closed position shown in FIG. 3. This leads to interruption of communication between the internal passage 12 of the main member 11 and the internal passage 22 of the fitting member 21, during which the on-off valve 31 is applied thereto a pressure of fluid or gas. Concurrently, the sleeve 15 is forced in a left-hand direction in FIG. 3 by elastic force of the coiled spring 16 and kept at its engaged position at which it is engaged with the balls 14 by the spring 16, so that the cam surface 15a projects a part of each of the balls 14 inwardly into the internal passage 12 of the main member 11.

Connection of the connecting plug 40 to the socket body 10 is carried out by thrusting the sleeve 15 to its thrusted position against the coiled spring 16 in a direction of an arrow a in FIG. 3 to release engagement of the balls 14 with the cam surface 15a of the sleeve 15 and then fitting the cylindrical connecting portion 43 of the connecting member 41 in the internal passage 12 of the main member 11 which pushing away the balls 14. This results in a distal end of the cylindrical connecting portion 43 being abutted against the annular groove 34a of the on-off valve 31 to push the on-off valve 31 against the coiled spring 35 and a pressure of gas applied thereto to open it. Then, when the sleeve 15 is released from its thrusted position, it is forced to its engaged position in a direction of an arrow b in FIG. 4 to cause the cam surface 15a to inwardly project the balls 14 to fit the balls in the annular groove 44 of the connecting plug 40, resulting in connection between the socket body 10 and the connecting plug 40 being accomplished as shown in FIG. 4. This leads to communication between the internal passages 22 and 12 to permit pressurized gas to be flowed from the passage 22 to the passage 42.

Disconnection of the connecting plug 40 from the socket body 10 is easily carried out by thrusting the sleeve 15 against the coiled spring 16 to its thrusted position in the direction of the arrow a to disengage the balls 14 from the cam surface 15a and then drawing out the connecting plug 40 from the socket body 10. This causes the on-off valve 31 to be forcedly pressed against the valve seat 13 by the coiled spring 35, to thereby be held at its closed position, resulting in interrupting communication between the internal passages 12 of the main member 11 and the internal passage 22 of the fitting member 21. Then, releasing of the sleeve 15 from its thrusted position causes the sleeve 15 to be pushed to its original or engaged position by the coiled spring 16, so that the cam surface 15a projects the balls 14 inwardly into the internal passage 12.

In the conventional pipe fitting constructed as described above, interruption of communication between the internal passages 12 and 22 is carried out by seating the disc-like on-off valve 31 on the valve seat 13. Unfortunately, this causes the on-off valve 31 to still positioned between the passages 12 and 22 even after both passages are communicated with each other, so that it produces flow resistance in a flow path of pressurized fluid or gas sufficient to prevent smooth flowing of gas in the pipe fitting. Also, the conventional pipe fitting has another disadvantage in that connection of the connecting plug 40 to the socket body 10 requires to forcedly push the on-off valve 31 against elastic force of the coiled spring 35 and a pressure of gas applied thereto, resulting in a large operating force being required for the connection. Such a disadvantage is noteworthy because the pressure is applied to a whole surface of the disc-like on-off valve 31. Further, the connection is carried out by merely fitting the cylindrical connecting portion 43 of the connecting member 41 in the internal passage 12 of the main member 11 without using any sealing means, accordingly, the conventional pipe fitting often causes outward leakage of pressurized fluid through a small gap between the internal passage 12 of the main member 11 and an outer peripheral surface of the cylindrical connecting portion 43 before the distal end of the cylindrical connecting portion 43 is pressedly seated on the valve seat 13 acting as also a packing.

SUMMARY OF THE INVENTION

The present invention has been made in view of the foregoing disadvantage of the prior art.

Accordingly, it is an object of the present invention to provide a pipe fitting which is capable of substantially minimizing flow resistance in a flow path of pressurized fluid, decreasing the force required for connecting operation and preventing leakage of fluid therethrough during connecting operation.

In accordance with the present invention, a pipe fitting is provided. The pipe fitting includes a socket body comprising a main member and a fitting member each formed therein with an internal passage. The internal passage of the main member is circumferentially formed with a stepped support portion, and in the stepped support portion are securely arranged an annular valve seat acting also as a packing and a support ring in this order. Also, the main member is provided therein with an on-off valve and a helical spring acting on said on-off valve. The on-off valve is arranged on the support ring in a manner to be pivotally moved about a support shaft and normally seated on a surface of the valve seat by the helical spring. Further, the main member is formed on an opening side thereof with holding through-holes which are arranged so as to be spaced from one another at predetermined intervals in a circumferential direction of the main member and in which balls for engagement are movably arranged. The main member is also provided on an outer periphery thereof with an operating sleeve in a manner to be slidable in its axial direction, which is normally held at its engaged position by a coiled spring and formed on an inner periphery thereof with a cam surface adapted to be normally engaged with the balls to project them into the internal passage. The pipe fitting also includes a connecting plug including a connecting member. The connecting member is formed into a hollow cylindrical shape with an outer configuration sufficient to cause the connecting plug to be detachably fitted in the internal passage of the main member and is provided on a side thereof connected to the main member with a cylindrical connecting portion, which is formed on an outer periphery thereof with an annular groove engaged with the balls. Thus, the on-off valve is opened when the connecting plug is engagedly connected to the socket body.

Thus, in the pipe fitting of the present invention constructed as described above, the operating sleeve of the socket body is thrust to its thrusted position against the coiled spring and the cylindrical connecting portion of the connecting member of the connecting plug is fitted in the internal passage of the main member while pushing away the balls, so that the cylindrical connecting portion pushes the on-off valve against the helical spring to pivotally move it about the support shaft to open it. Then, releasing of the operating sleeve from its thrusted position causes the cam surface to be engaged with the balls to project them into the internal passage of the main member, resulting in accomplishing connection between the socket body and the connecting plug while ensuring communication between the internal passages.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DESCRIPTION OF THE PREFERRED EMBODIMENT

A pipe fitting according to the present invention will now be described with reference to FIGS. 1 and 2.

Figure 1:
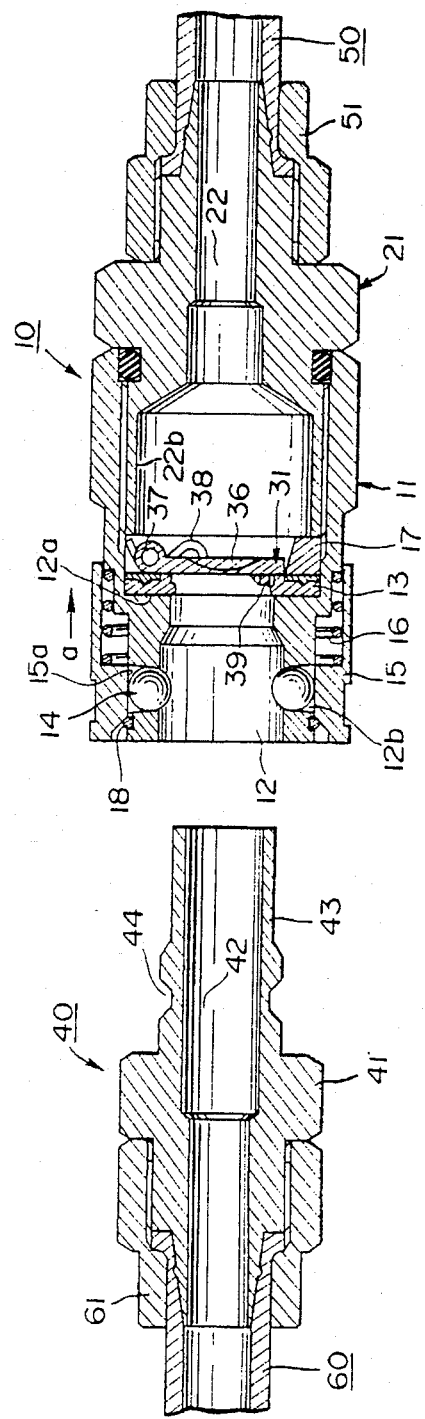
FIG. 1 is an exploded vertical sectional view showing an embodiment of a pipe fitting according to the present invention wherein it is not in use prior to connecting operation.
Figure 2:
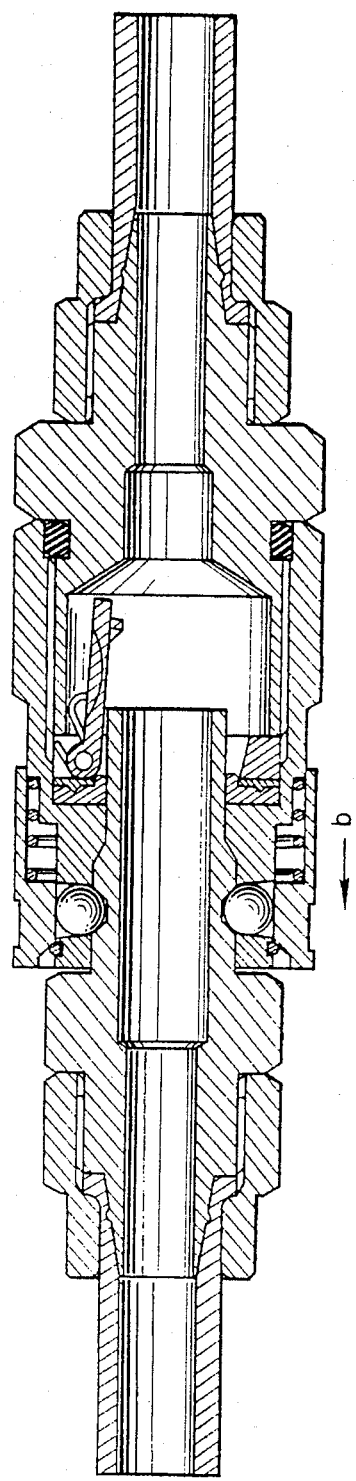
FIG. 2 is a vertical sectional view showing the pipe fitting of FIG. 1 wherein it is in use after the connecting operation.
Figure 3:
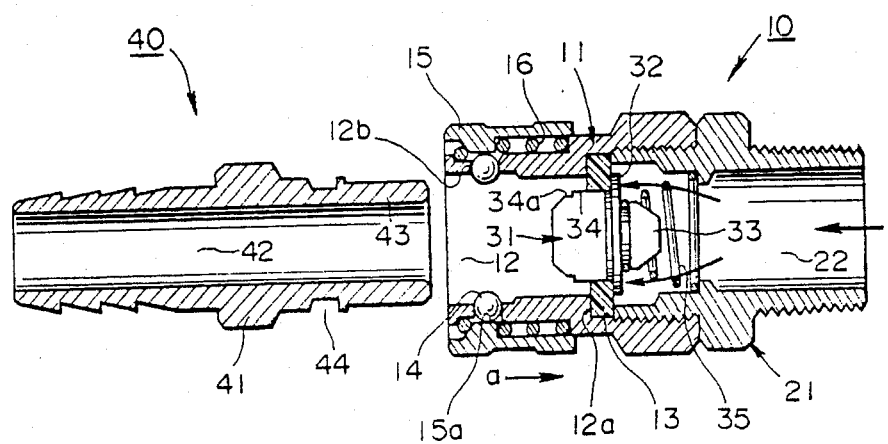
FIG. 3 is an exploded vertical sectional view showing a conventional pipe fitting wherein it is not in use prior to connecting operation.
Figure 4:
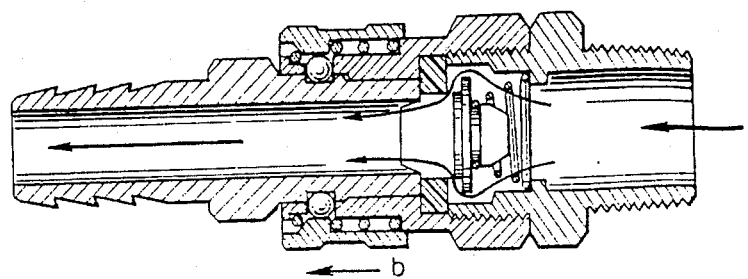
FIG. 4 is a vertical sectional view showing the pipe fitting of FIG. 3 wherein it is in use after connecting operation.

A pipe fitting shown in FIGS. 1 and 2 includes a socket body 10 and a connecting plug 40 connected to the socket body 10 as in the prior art described above. The socket body 10 is connected at one end thereof to a supply line 50 for fluid such as pressurized gas by means of a fixing nut 51 and the connecting plug 40 is connected at one end thereof to an inlet pipe 60 extending from a gas appliance or the like by means of a fixing nut 61.

The socket body 10 includes a main member 12 and a fitting member 22 formed into a hollow cylindrical shape so that internal passages 12 and 22 may be formed therein, respectively. The internal passage 12 of the main member 11 is circumferentially provided on a connection side thereof with a stepped support portion 12a of an annular shape, in which an annular valve seat 13 acting also as a packing and an annular support ring 17 are arranged in order. The valve seat 13 is securely held at the stepped support portion 12a by an end of an enlarged portion 22b of the fitting member 21 threadedly fitted in the internal passage 12 of the main member 11 from the connection side of the main member 11. The enlarged portion 22b of the fitting member is formed with an increased diameter. On one side of the valve seat 13 is openably seated a butterfly-like on-off valve 31, which is arranged in a manner to be pivotally moved about a support shaft as described hereinafter. The on-off valve 31 serves to selectively interrupt communication between the internal passage 12 of the main member 11 and the internal passage 22 of the fitting member 21.

An inner wall of the internal passage 12 of the main member 11 defining the internal passage 12 is formed on an opening side thereof with a plurality of tapered through-holes 12b for holding in a manner to be circumferentially spaced from one another at predetermined angular intervals, in which balls 14 for engagement are fitted. The main member 11 is provided on an outer periphery thereof with an operating sleeve 15 operated for releasably connecting the connecting plug 40 to the socket body 10. The operating sleeve 15 is fitted on the main member 11 so as to be slidable in an axial direction thereof and provided on an inner peripheral surface thereof with a cam surface 15a. The operating sleeve 15 is normally held at its engaged position at which the cam surface 15a is engaged with the balls 14 by elastic force of a coiled spring 16 of a cylindrical shape interposed between the sleeve 15 and the main member 11, so that the cam surface 15a projects the balls 14 into the internal passage 12. Reference numeral 18 designates a snap ring for preventing the sleeve 15 from releasing from the main member 11.

The on-off valve 31 includes a disc-like valve plate 36 arranged in a manner to be pivotally openable with respect to a side facing the internal passage 22 about a support shaft 37 positioned on one side of the support ring 17 and urged by a helical spring 38 wound on the support shaft 37 so as to be normally pressedly contacted with the valve seat 13 and an operating projection 39 provided on a side of the valve plate 36 facing the internal passage 22 of the main member 11. When the valve plate 36 is pressedly contacted with the valve seat 13, the ring-like valve seat 13 is deformed to cause a part thereof to be somewhat expanded toward the internal passage 12.

The connecting plug 40 is formed into a shape like a hollow cylinder of an outer configuration sufficient to permit the connecting plug 40 to be detachably fitted in the internal passage 12 of the main member 11. The connecting plug 40 includes a connecting member 41 formed therein with a passage 42 and having a cylindrical connecting portion 43 arranged on its connection side. The cylindrical connecting portion 43 is formed on an outer periphery thereof with an annular groove 44 which is adapted to be detachably engaged with the balls 14.

When the pipe fitting of the illustrated embodiment constructed as described above is not in use wherein the connecting plug 40 is not connected to the socket body 10, the on-off valve 31 is forcedly pressed against the valve seat 13 due to an elastic force of the helical spring 38, to thereby be held at its closed position shown in FIG. 1. This leads to interruption of communication between the internal passage 12 of the main member 11 and the internal passage 22 of the fitting member 21, during which the valve seat 13 is forcedly deformed to cause a part of an inner peripheral portion thereof to be somewhat expanded toward the internal passage 12. In this state, the on-off valve 31 has applied thereto a pressure of fluid or gas. Concurrently, the sleeve 15 is forced in a left-hand direction in FIG. 1 by elastic force of the coiled spring 16, so that the cam surface 15a is engaged with the balls 14 to project a part of each of the balls 14 inwardly into the internal passage 12 of the main member 11.

Connection of the connecting plug 40 to the socket body 10 is carried out by thrusting the sleeve 15 to its thrusted position in a direction of an arrow a in FIG. 1 against the coiled spring 16 to release the engagement of the balls 14 with the cam surface 15a of the sleeve 15 and then fitting the cylindrical connecting portion 43 of the connecting member 41 in the internal passage 12 of the main member 11 while outwardly pushing away the balls 14.

This causes a distal end of the cylindrical connecting portion 43 to be abutted against the operating projection 39 while being sealingly contacted with the portion of the valve seat 13 expanded toward the internal passage 12 to keep sealing sufficient to prevent leakage of gas in the course of connection of the connecting plug 40 to the socket plug 10. This results in the on-off valve 31 being pushed against elastic force of the helical spring 38 and a gas pressure applied thereto and pivotally moved about the support shaft 37. More particularly, the disc-like valve plate 36 of the on-off valve 31 is gradually inclined due to the pivotal movement to decrease the pressure applied thereto, so that the on-off valve may be actuated with a small quantity of operating force. Also, the on-off valve 31 does not produce any flow resistance in a flow path of the gas when it is opened, because the on-off valve 31 is positioned on one side in the enlarged portion 22b formed with a large diameter. Then, when the operating sleeve 15 is released from its thrusted position, it is forced to its engaged position in the direction of arrow b in FIG. 2 by the coiled spring 16, so that the cam surface 15a may be abutted against the balls 14 to inwardly project them and fit the balls in the annular groove 44 of the connecting plug 40, resulting in connection between the socket body 10 and the connecting plug 40 being accomplished as shown in FIG. 2. This leads to communication between the internal passages 22 and 12 sufficient to permit gas to be smoothly flowed from the passage 22 through the passage 12 to the passage 42 without any flow resistance.

Disconnection of the socket body 10 from the connecting plug 40 is easily carried out while maintaining a seal between the plug 40 and socket body 10 by thrusting the sleeve 15 to its thrusted position in the direction of the arrow a against the coiled spring 16 to release the balls 14 from engagement with the cam surface 15a and then drawing the connecting plug 40 from the socket body 10. This causes the on-off valve 31 to be forcedly pressed on the valve seat 13 by the helical spring 38, to thereby be held at its closed position, resulting in interrupting communication between the internal passage 12 of the main member 11 and the internal passage 22 of the fitting member 21. Then, releasing of the sleeve 15 from its thrusted position causes the sleeve 15 to be pushed to its original or engaged position by elastic force of the coiled spring 16, so that the cam surface 15a is engaged with the balls to project them into the internal passage 12.

As described above, in the pipe fitting of the present invention, the annular valve seat and support ring are securely arranged in order in the stepped support portion provided in the internal passage of the main member, and the on-off valve and helical spring are arranged in the main member so that the valve may be pivotally moved about the support shaft and normally seated on the valve seat by the helical spring. Also, the main member is circumferentially formed on its opening side with the through-holes for holding in which the balls for engagement are movably arranged and is provided on its outer periphery with the operating sleeve so as to be slidable in the axial direction, which is normally held at its engaged position by the coiled spring and formed on its inner periphery with the cam surface engaged with the balls to project them into the internal passage of the main member. Further, the connecting member is formed into a hollow cylindrical shape of an outer configuration sufficient to be detachably fitted in the internal passage of the main member. Such construction of the present invention permits the on-off valve to be easily and positively opened by fitting the connecting plug in the internal passage of the main member while thrusting the operating sleeve against the coiled spring. Also, the construction ensures sealing between the socket body and the connecting plug during the connecting operation, to thereby prevent leakage of gas during the connection. Also, operation of the on-off valve is carried out by its pivotal movement about the support shaft on one side of the enlarged portion in the fitting member, to thereby prevent the on-off valve from producing any flow resistance. Also, the on-off valve is so operated that disc-like surface of the valve is gradually inclined, to thereby cause a pressure of fluid applied to the valve to be decreased. This results in an operating force required to open the valve being significantly reduced. Also, the pipe fitting of the present invention may be easily and readily manufactured at low cost.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A pipe fitting comprising:
   a socket body including a main member and a fitting member each formed with an internal passage;
   said internal passage of said main member being formed with a stepped support portion of an annular shape;
   said stepped support portion having a deformable annular valve seat acting also as a packing and a support ring securely arranged therein in order;
   said main member being provided therein with an on-off valve and a helical spring acting on said on-off valve, said on-off valve being arranged on said support ring in a manner to be pivotally moved about a support shaft and normally seated on a surface of said deformable annular valve seat by an elastic force of said helical spring so that a part of said deformable annular valve seat is expanded toward said internal passage of said main member;
   said main member being formed on an opening side thereof with holding through-holes which are circumferentially spaced from one another at predetermined intervals and in which balls for engagement are movably arranged;
   said main member being provided on an outer periphery thereof with an operating sleeve slidable in an axial direction of said main member;
   said operating sleeve being normally held at its engaged position by an elastic force of a coiled spring and formed on an inner periphery thereof with a cam surface engaged with said balls to project said balls into said internal passage of said main member; and
   a connecting plug including a connecting member;
   said connecting member being formed into a hollow cylindrical shape with an outer configuration sufficient to cause said connecting plug to be detachably fitted in said internal passage of said main member;
   said connecting member being provided on a side thereof connected to said main member with a cylindrical connecting portion, said cylindrical connecting portion being formed on an outer periphery thereof with an annular groove engaged with said balls;
   said on-off valve being opened when said connecting plug is engagedly connected with said socket body.

2. The pipe fitting according to claim 1, which comprises an operating projection member which extends from said on-off valve.

3. The pipe fitting of claim 1, wherein said on-off valve comprises a disc-like valve plate.

* * * * *